Jan. 7, 1969   F. K. H. NALLINGER ET AL   3,420,327
RIGID DRIVE AXLE FOR MOTOR VEHICLES

Filed Dec. 17, 1965

INVENTORS.
FRIEDRICH K. H. NALLINGER
ALFRED H. MÜLLER
ROLAND WIRLITSCH
HELMUT HÖHN

Dicke & Craig

BY                                   ATTORNEYS

INVENTORS.
FRIEDRICH K. H. NALLINGER
ALFRED H. MÜLLER
ROLAND WIRLITSCH
HELMUT HÖHN

United States Patent Office 3,420,327
Patented Jan. 7, 1969

3,420,327
RIGID DRIVE AXLE FOR MOTOR VEHICLES
Friedrich K. H. Nallinger, Stuttgart, Alfred H. Müller, Waiblingen, Roland Wirlitsch, Stuttgart, and Helmut Höhn, Gaggenau, Baden, Germany, assignors to Daimler-Benz Aktiengesellschaft, Stuttgart-Unterturkheim, Germany
Filed Dec. 17, 1965, Ser. No. 514,579
Claims priority, application Germany, Dec. 18, 1964,
D 46,086
U.S. Cl. 180—43                    16 Claims
Int. Cl. B60k 17/24; B60b 35/14

ABSTRACT OF THE DISCLOSURE

A rigid drive axle for motor vehicles, especially cross-country commercial-type vehicles or buses whereby an axle gear is operatively connected on both sides with a respective wheel by way of one drive shaft each and whereby the wheel center lines are offset with respect to the center lines of the output shafts of the axle gear and possibly are additionally inclined. Preferably, the drive shafts are carried within inclined tubular axle bearers having flanged connections with the wheel structure and axle gear housing that are at least transverse to one of the connected parts. The wheel may have an intermediate gear means to offset the adjacent end of the drive shaft with respect to the wheel center line. The axle gear may be asymmetrical, the system may be used with a steerable wheel, and an intermediate double flanged tubular piece may be used to form the connection between the bearer and its adjacent part.

Background of the invention

Such types of axles are intended to serve the purpose to create with cross-country-type vehicles a greater road clearance. With a known prior art rigid axle of the aforementioned type, commonly designated as high-built axle, the off-set of the wheel centers with respect to the output shaft centers of the axle gear is achieved by the provision of a spur-gear intermediate gear between the wheel bearing pins or journals and the driven shafts of the axle gear. This leads to a substantially rectangularly shaped over-all construction of the axle, but entails inter alia two significant disadvantages: On the one hand, high separating forces occur between the two mutually meshing spur gears of the intermediate gear, which leads to high loads and stresses of the bearing. On the other hand, by reason of the axle distance of the intermediate or countershafts, a relatively high vehicle frame has to be provided. The latter is unsuited in particular for a double axle arrangement because little freedom of movement exists at the frame for the realization of the drive.

Summary of the invention

The present invention is concerned with the task to avoid the aforementioned disadvantages and therebeyond to achieve further advantages to be described more fully hereinafter.

The present invention solves the problems existing with the axles of the aforementioned type in that the drive shafts are arranged within tubularly shaped axle bearers and these tubularly shaped axle bearers extend at an inclination between the wheel centers and the axle gear.

The axle in accordance with the present invention will exhibit an arcuate-like shape as compared to the known high-built axle. Since the road clearance is defined in general as a part of a circular arc extending between the wheels above the road surface, a considerably better adaptation of the axle is achieved thereby. Further, one is no longer tied in principle beforehand to a countershaft transmission or intermediate gear, i.e., the harmful separating forces can be eliminated. Additionally, the frame—with the same road clearance—can be disposed lower since the frame supports are arranged lower by reason of the inclined axle bearers.

Such an inclination of the tubularly shaped axle bearers is preferred that the wheel centers and the output shaft centers of the axle gear are disposed one above the other in an essentially vertical vehicle transverse plane. This will be best for the normal case of cross-country commercial-type vehicles. However, if the constructional design of the vehicle so requires, it is quite within the scope of the present invention that the aforementioned vehicle transverse plane assumes an inclined position or even a horizontal position. Thus, it would, for example, be quite feasible that the axle can be placed around another constructional element of the vehicle, for example, the oil pan of the engine in the manner described above. Hence, altogether a better space utilization can be achieved with the present invention.

With the actual construction, one will proceed with commercial type vehicles for the realization of a good road clearance according to the present invention in such a manner that the tubularly shaped axle bearers extend upwardly at an inclination from both wheels toward the axle gear. Conversely, for purposes of achieving a large interior space or a low frame, for example, with buses, the axle gear can also be arranged below the wheel axis so that the tubularly shaped axle bearers extend downwardly at an inclination in the direction toward the axle gear.

Several possibilities exist for the transmission or torque to the wheels. In the simplest form according to one embodiment of the present invention the drive shafts are connected directly with the wheel by way of at least one joint.

However, a further development of the present invention proposes to connect the drive shafts by way of at least one joint with an intermediate gear which in turn drives the wheel. In principle any known gear or transmission, i.e., for example, a spur wheel countershaft gear or a planetary gear may be used, and more particularly the latter preferably with a drive input off-set with respect to the output.

A planetary gear of the last-mentioned type or another gear with an output off-set relative to the input thereof may serve in an advantageous manner for complementing the main inventive concept of the present invention. This takes place according to the present invention by such an arrangement and construction of the intermediate gear that the axle off-set in the intermediate gear is added to the off-set between the wheel center and the center of the output shaft of the axle gear obtained by the inclination of the axle bearers. The arcuate curvature of the axle is thereby enhanced. For the support and protection of the inclined drive shafts and additionally for the absorption of the drive and brake moments produced by the wheel as well as for the absorption of the bending moment cuased by the pay load, one tubularly shaped axle bearer is provided for each drive shaft and is so arranged that the tubularly shaped axle bearer is flangedly connected at the housing of the axle gear whereby the flange lies in the cross plane of one part and is similarly inclined at the other part. The flanges of the tubularly shaped axle bearers may be arranged at different—always mutually coordinated—angular positions to the tube axis so that with otherwise unchanged axle parts, axles with different center off-sets between the wheel and axle housing can be obtained by the exchange merely of the axle bearers. On the other hand, according to a special construction of the present invention, an intermediate piece constructed possibly in the manner of a pipe elbow may be arranged between the tubularly shaped axle bearer and the axle gear housing whereby the connecting flanges are located in cross planes of the tubularly shaped axle bearer and axle gear housing. In principle what was said above also applies to the manner of securing the tubularly shaped axle bearers at the wheel bearer or at the intermediate gear.

The arrangement of an elbow-like intermediate piece— on the one hand between the tubularly shaped axle bearer and the axle gear axis and on the other between the former and the wheel carrier or intermediate gear housing—offers the great advantage that for different constructions of the axle, for example, as regards the angle of inclination of the drive shafts, the same tubularly shaped axle bearers and axle gear housing as well as wheel carriers and/or intermedaite transmission housing may be used.

The axle gear housing which is normally arranged symmetrically in the center of the axle, may, under certain circumstances—if the construction so requires—be off-set laterally. This leads to different angles of inclination of the drive shafts and therewith also to different bending angles at the affected joints. The danger exists thereby that on the one side of the axle gear the maximum permissive bending angle of the joint is reached or even exceeded whereas, in contrast, on the other side of the axle gear, the joints are loaded relatively slightly as regards bending. In order to obviate this drawback, i.e., in order to approximate far-reachingly the bending angle to one another, the present invention proposes that the axle gear housing is inclined in such a manner with respect to a horizontal that its output shaft center lines are disposed approximately perpendicularly to the bisecting line of the angle subtended by the tubularly shaped axle bearers.

The present invention is applicable in principle to steered and non-steered axles. With the former, the present invention provides that the tubularly shaped axle bearer passes over directly into the fork-arm accommodating the steering pins or is directly connected with the same and the center point of the joint between the drive shaft and the wheel lies on the steering pin axis. The number, arrangement, and construction of the joints themselves may vary from construction to construction and may thus be chosen at will to fulfill the particular requirements whereby only the maintenance of synchronism is of significance.

Accordingly, it is an object of the present invention to provide a rigid axle of the type described above which eliminates the aforementioned shortcomings and drawbacks encountered with the prior art constructions.

Another object of the present invention is to provide a rigid axle which is simple in construction yet permits an improved road clearance by simple means.

A further object of the present invention resides in a rigid axle for motor vehicles which eliminates, without impairing good road clearance of the vehicle, the high separating forces encountered with the prior art constructions utilizing a connecting gear as well as the need for relatively high vehicle frames.

A still further object of the present invention resides in a rigid axle of the aforementioned type which permits a vastly improved adaptation of the axle to the particular requirements.

Still another object of the present invention resides in a rigid axle which permits the use of identical parts yet enables different constructions by the use of different intermediate pieces.

*Brief description of the drawing*

These and further objects, features, and advantages of the present invention will become more obvious from the following description when taken in connection with the accompanying drawing which shows, for purposes of illustration only, several embodiments in accordance with the present invention, and wherein:

FIGURE 5 is a partial cross-sectional view, on an enlarged scale, through a non-steerable axle of the construction according to FIGURE 1;

*Detailed description of the drawing*

Figure 1:
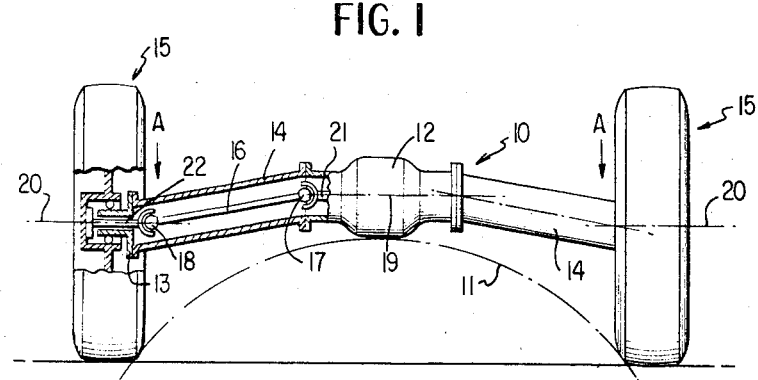
FIGURES 1 to 4 are somewhat schematic end elevational views, partly in cross section, of four different axle constructions in accordance with the present invention.

Referring now to the drawing, wherein like reference numerals are used throughout the various views thereof to illustrate like parts, and more particularly to the embodiment of FIGURE 1, reference numeral 10 generally designates therein the axle which is constructed of arcuate-like shape and thus adapts itself well to the road clearance defined as the arc 11. This construction of the axle 10 is realized in that the tubularly shaped axle bearer 14 connected, on the one hand, with the axle gear housing 12 and, on the other, with the wheel carrier 13, extends with a downward inclination toward the wheel generally designated by reference numeral 15. A corresponding inclination is given to the drive shaft 16 arranged within the tubularly shaped axle bearer 14; the drive shaft 16 is connected by joints 17 and 18, on the one hand, with the drive shaft 21 in the axle gear 12 and, on the other, by way of the wheel bearing pin or journal 22 directly with the wheel 15. An increased road clearance thus results in this embodiment from the fact that the center line 19 of the drive shafts 21 of the axle gear housing 12 assumes a higher position with respect to the wheel center line 20. Nevertheless, this increased road clearance signifies no raising of the frame support or no significant raising of the frame support which is normally located at the place A, i.e., it can be achieved with the same location of the frame and practically without abandonment of any spring paths.

Figure 2:
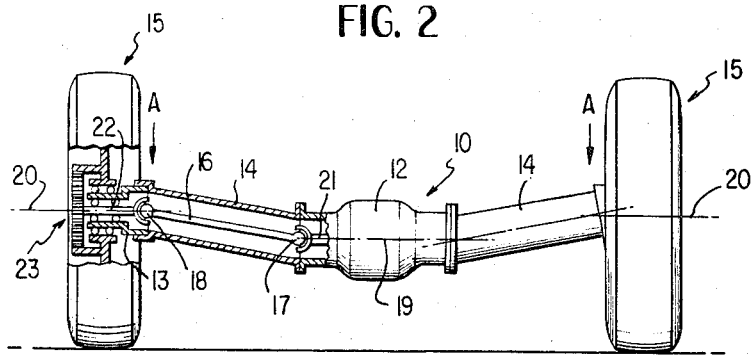

In the embodiment according to FIGURE 2, the tubularly shaped axle bearer 14 and the drive shaft 16 extends with an upward inclination in the direction toward the wheel 15. As a result thereof, the center line 19 of the drive shafts 21 of the axle gear housing 12 come to lie below the wheel center line 20 and the entire axle extends curved in the downward direction, i.e., in a trough-like manner. This construction may find application, for example, in buses, in which the lower axle gear 12 makes possible a larger construction and lower arrangement of the interior space within the vehicle center. The drive takes place in this embodiment from the wheel bearing pin 22 to the wheel 15 by way of a planetary gear generally designated by reference numeral 23 and to be further described in detail hereinafter.

In the embodiment according to FIGURE 3, the axle 10 is again constructed of arcuate shape curved in the upward direction. The drive of the wheel bearing pins 22 takes place by way of a spur-wheel connecting gear generally designated by reference numeral 24, displaced out of the wheel plane in the inward direction; the drive pinion 25 of the intermediate gear 24 is arranged above the driven gear 26. One obtains thereby a further increase in the road clearance since the distance of the shafts of the intermediate gear 24 is appropriately added to the offset of the axes 19 and 20 gained by the inclination of the axle bearer 14. Otherwise, this construction corresponds to that of FIGURE 1.

Figure 4:
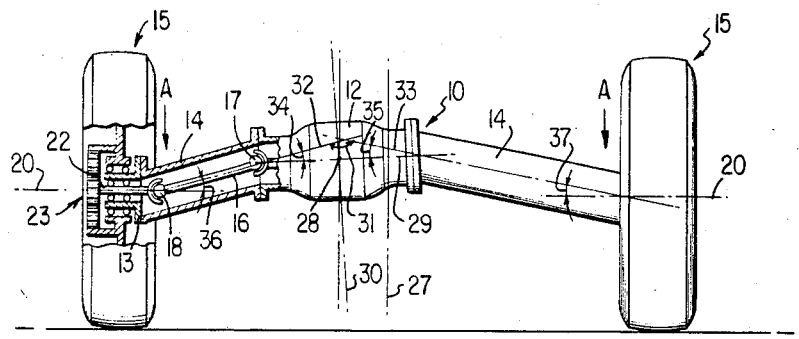

In the embodiment according to FIGURE 4, the axle gear 12 of the axle 10, constructed in principle of arcuate shape corresponding to FIGURE 1, is located outside of, i.e., eccentric to the vehicle center 27. The axle gear 12 is rotated about the point 28 in such a manner that the center axis 29 of its output shafts is approximately perpendicular to the bisecting line 30 of the angle 31 which is formed by the center lines 32 and 33 of the drive shafts 16, in this case of different length and extending at different inclinations. As a result of such an inclination of the axle gear 12, there is achieved for purposes of uniform loading of the universal joints, an approximation of the angles 34 and 35 and of the angles 36 and 37, i.e., the larger angle becomes smaller and the smaller angle becomes larger. For the drive of the wheel 15, a planetary gear generally designated by reference numeral 23 is provided also in this embodiment according to the construction of FIGURE 2.

A construction of an axle according to the schematic showing of FIGURE 1 is illustrated in detail in FIGURE 5. The tubularly shaped axle bearer 14 is flanged connected on the one hand, at the axle gear housing 12, and on the other, at the wheel carrier 13 and is arranged inclined downwardly in the direction toward the wheel 15. The inclination of the axle bearer 14 is produced by corresponding construction of the flanges 38 and 39 at the ends thereof. These flanges 38 and 39 are inclined with respect to the cross planes of the axle bearer perpendicular to the axis thereof, whereas the counter flanges 40 and 41 at the axle gear housing 12 and at the wheel carrier 13, respectively, are located within the cross planes of the corresponding parts. The brake drum 43, the wheel felly or rim 44, and a disc 45 are secured by means of bolts (not illustrated) at the hub body 42. The hub body 42 is supported on the cylindrically shaped wheel carrier 13 by means of conical roller bearings 46 and 47. The wheel bearing pin or journal 22 is supported by means of a roller bearing 49 in a bore 48 on the inside of the wheel carrier 13 and, for the purpose of the direct drive of the wheel 15, is secured at one end to the disc 45 and with the other end, which passes over into the universal joint 18, to the drive shaft 16.

Figure 6:
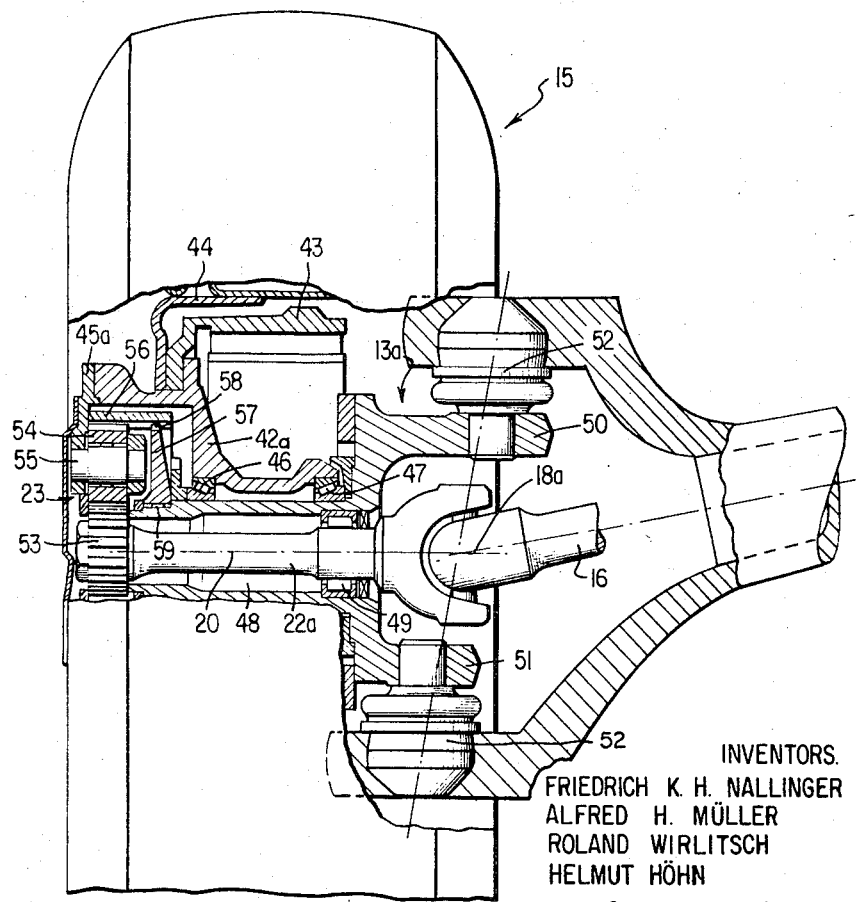
FIGURE 6 is a partial cross-sectional view, on an enlarged scale, through a steerable axle with a drive according to FIGURE 2.

The embodiment illustrated in FIGURE 6 relates to a steered axle. For this purpose, the wheel carrier 13a is constructed of fork shape at its end facing the joint 18a and carries at the fork arms 50 and 51 conventional ball joints 52. The wheel carrier 13a is pivotally connected by means of these ball joints 52 at the tubularly shaped axle bearer (not illustrated in the drawing) which is also constructed of fork shape at its end facing the wheel 15. The coordination of the joints 52 to the joint 18a is thereby made in such a manner that the center points of the three joints 52, 18a, 52 are on a straight line. The joint 18a is constructed in this embodiment as double joint or synchronizing joint in order to equalize non-uniform rotary movements of the wheel bearing pin 22a caused by the steering movement and the inclination of the drive shaft 16. The joint between the drive shaft 16 and the axle gear shaft 21 (not illustrated in the drawing) has to be constructed correspondingly as double universal joint or as synchronizing joint.

The drive from the wheel bearing pin 22a to the wheel 15 takes place by way of a planetary gear generally designated by reference numeral 23. A sun gear 53 is splined to the wheel bearing pin 22a which serves as driving gear or pinion. The sun gear 53 drives, by way of planet gears 54, the planet carrier 55 which, in turn, is rigidly connected by way of the disk part 45a with the hub body 42a. The planet gears 54 roll off along the hollow ring gear 56 which is rigidly connected by way of disk 57 and by means of splined connections 58 and 59 with the wheel carriers 13a. As a result thereof, the wheel 15 is driven with a reduced rotational speed with respect to the speed of the wheel bearing pin 22a.

Figure 7:
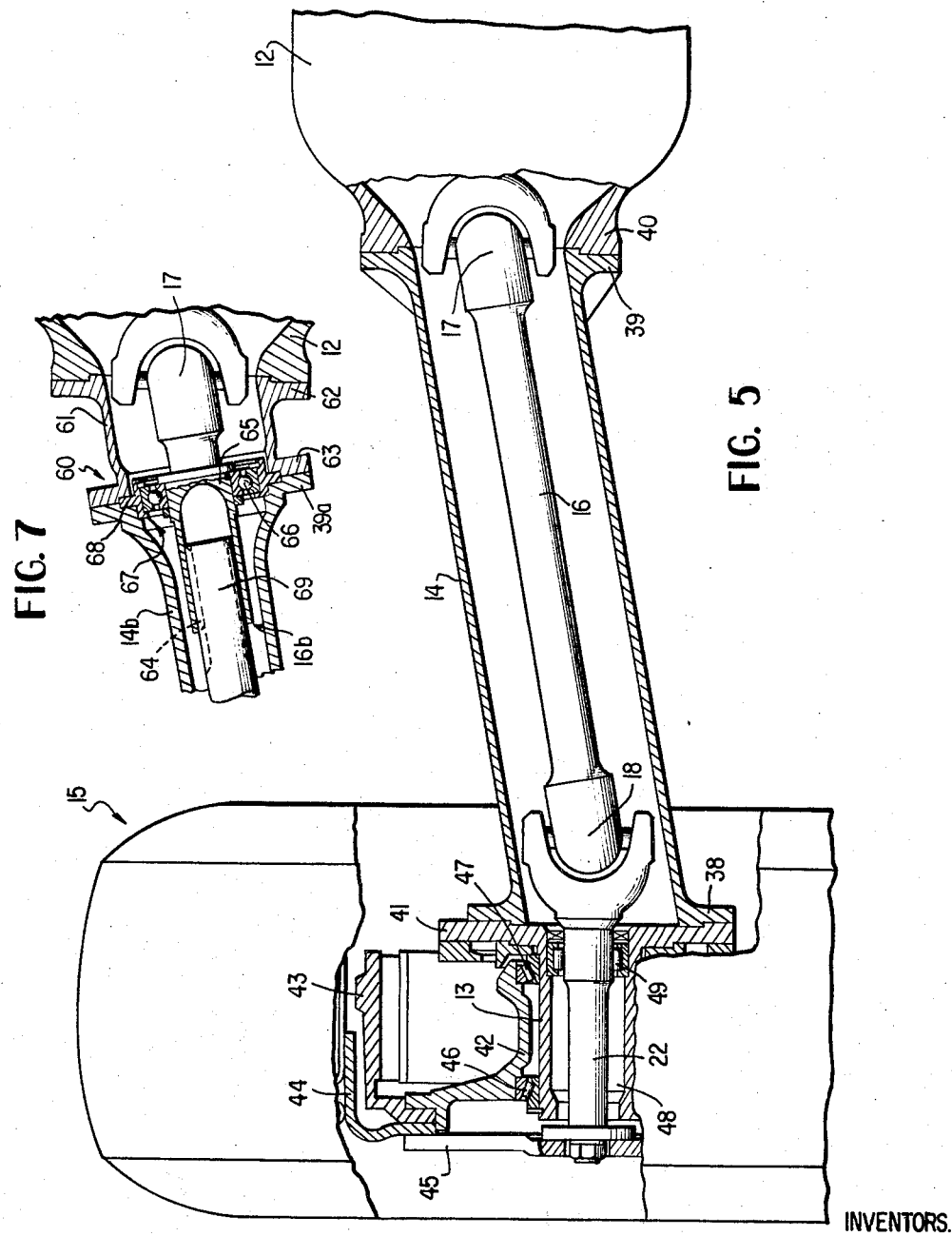
FIGURE 7 is a partial cross-sectional view illustrating one construction for securing the tubularly shaped axle bearer at the axle gear housing and FIGURE 8 is a partial cross-sectional view illustrating a further embodiment with the features of FIGURES 3 and 6 in combination.

FIGURE 7 illustrates a special construction directed to the connecting places at the tubularly shaped axle bearer which may otherwise exhibit all the particular features of the other constructions and embodiments described above. An intermediate part generally designated by reference numeral 60 is inserted between the axle gear housing 12 and the axle bearer 14b. The intermediate part 60 consists of a tubularly shaped piece 61; flanges 62 and 63 are arranged at the ends of the tubularly shaped piece 61 which flanges are inclined corresponding to the cross planes of the connecting parts. With the use of the intermediate part 60, it is possible to achieve an inclination of the axle bearer 14b without having to construct the flange 39a thereof inclined to its cross plane as was the case in the other embodiments. With the use of a corresponding intermediate part between axle bearer 14b and wheel carrier 13 or 13a, the same applies as stated above.

It is therefore possible by the arrangement of different intermediate parts 60 to achieve different wheel tracks as well as different axle inclinations, the latter by the use of similar axle bearers 14b and drive shafts 16b. However, the drive shafts 16b are of divided construction in this embodiment. A sleeve-shaped outer part 65 provided with splined-teeth 64 is supported by means of a ball bearing 66 in a bushing generally designated by reference numeral 67. A collar 68 arranged at the bushing 67 serves simultaneously for the axial fixing thereof and as centering means for the parts 14b and 60. An inner part 69 also provided with spline-teeth is arranged—axially displaceable but non-rotatable—within the sleeve-shaped outer part 65. As a result of these measures, possible changes in length of the drive shafts 16 which would exist with the use of different intermediate parts 60 can be compensated for.

Figure 3:
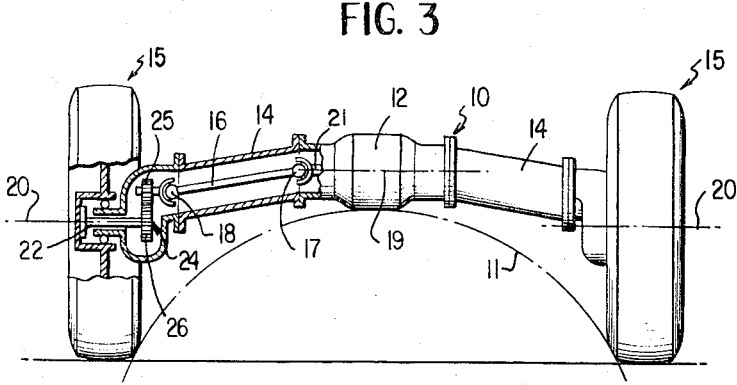
Figure 8:
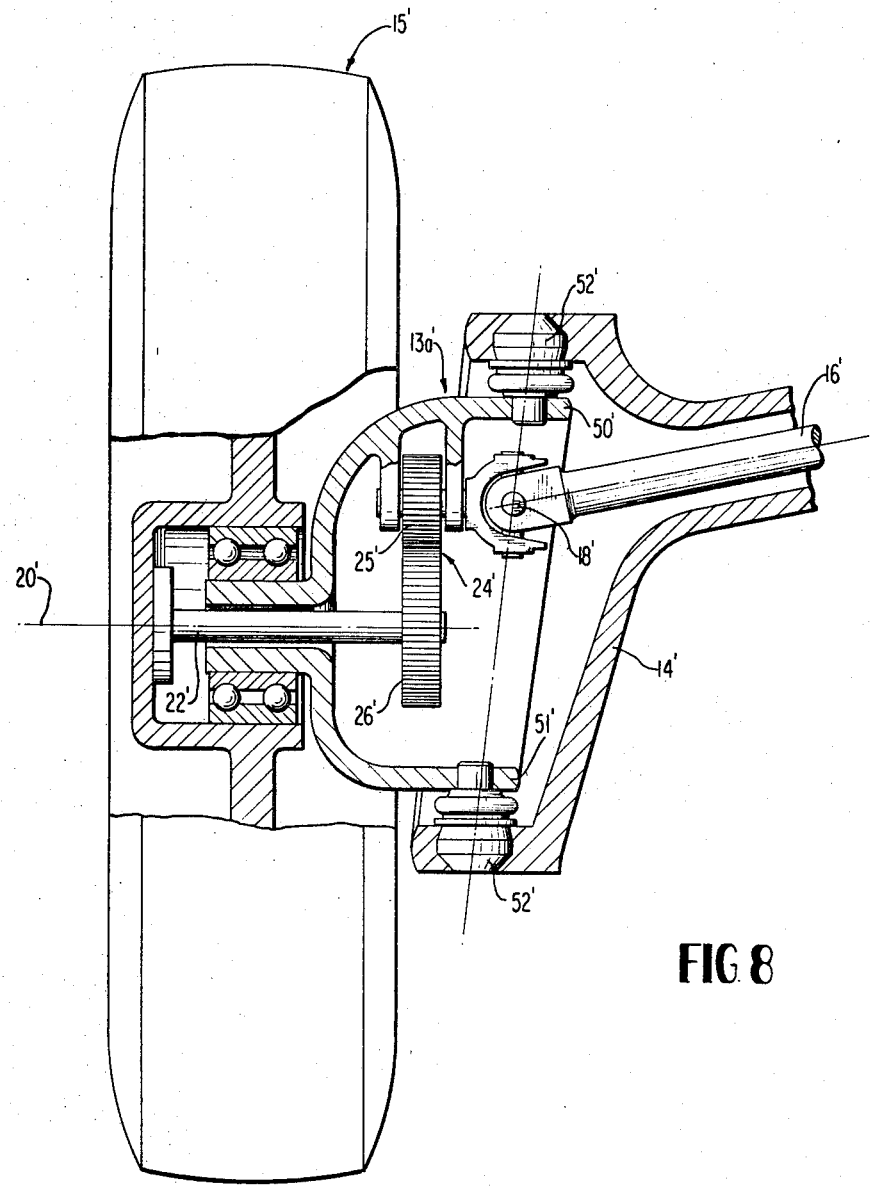

The embodiment according to FIGURE 8 combines the offset gear relationship of FIGURE 3 with the axle mounting of FIGURE 6. Further description is dispensed with, because the numerals are identical with those identical parts in the respective FIGURES 3 and 6, with primes being added to indicate the new embodiment.

We claim:

1. A rigid driving axle construction for driving the wheels of motor vehicles, especially cross-country commercial vehicles and buses, comprising axle gear means provided with output means on each side thereof, drive shaft means for each side of the vehicle operatively connecting said output means with a respective wheel, and tubularly shaped axle bearer means accommodating therewithin said drive shaft means, said axle bearer means extending at an inclination between the wheel centers and the axle gear means so that the wheel center lines are offset with respect to the center lines of the output means of the axle gear means, an intermediate piece constructed in the manner of an elbow section between the tubularly shaped axle bearer means and the axle gear housing means, said intermediate piece being provided with connecting flanges disposed in the cross planes of the axle bearer means and the axle gear housing means, respectively.

2. The axle construction according to claim 1, further comprising at least one joint means between a respective drive shaft means and the corresponding wheel for directly connecting the drive shaft means with the corresponding wheel.

3. The axle construction according to claim 1, wherein said axle gear housing means is arranged asymmetrically and is so inclined to a horizontal that the center lines of the output means thereof are approximately perpendicular to the bisector of the angle formed by the two tubularly shaped axle bearer means.

4. The axle construction according to claim 3, which is a steerable driving axle, and wherein the tubularly shaped axle bearer means are of forked construction, wheel carrier means also of forked construction, ball joint means operatively connecting the forked ends of the axle bearer means with the forked end of the wheel means, said at least one joint being a universal joint means, the center points of the ball joint and universal joint means being disposed on a substantially straight line.

5. The axle construction according to claim 4, wherein said connecting flanges of said housing and bearer means are correspondingly inclined.

6. A rigid driving axle construction for driving the wheels of motor vehicles, especially cross-country commercial vehicles and buses, comprising axle gear means provided with output means on each side thereof, drive shaft means for each side of the vehicle operatively connecting said output means with a respective wheel, and tubularly shaped axle bearer means accommodating therewithin said drive shaft means, said axle bearer means extending at an inclination between the wheel centers and the axle gear means so that the wheel center lines are offset with respect to the center lines of the output means of the axle gear means, at least one joint means operatively connected with a respective drive shaft means, intermediate gear means operatively connecting said joint means with a corresponding wheel, said intermediate gear means includes means providing an input axis and output axis offset with respect to each other, the axial offset of the input and output axes of said intermediate gear means being cumulative to the offset between the input axis and the output means of the axle gear means obtained by the inclination of said axle bearer means.

7. The driving axle construction according to claim 6, wherein said axle bearer means are so inclined that the wheel centers and the centers of the output means of said axle gear means are disposed one below the other in an essentially vertical vehicle transverse plane.

8. The driving axle construction according to claim 7, wherein said axle bearer means extend upwardly at an inclination from the two wheels toward the axle gear means.

9. The driving axle construction according to claim 6, wherein said axle bearer means extend upwardly at an inclination from the two wheels toward the axle gear means.

10. The axle construction according to claim 6, which is a steerable driving axle, and wherein the tubularly shaped axle bearer means are of forked construction, wheel carrier means also of forked construction, ball joint means operatively connecting the forked ends of the axle bearer means with the forked end of the wheel carrier means, said at least one joint being a universal joint means, the center points of the ball joint and universal joint means being disposed on a substantially straight line.

11. The axle construction according to claim 6, wherein said axle bearer means is flangedly connected to the housing of the axle gear means, the flange of the axle bearer means being disposed in the cross plane of one of said housing and bearer means and being correspondingly inclined at the other of said housing and bearer means with respect to said bearer means.

12. The axle construction according to claim 11, which is a steerable driving axle, and wheel carrier means of forked construction, ball joint means operatively connecting the axle bearer means with the forked end of the wheel carrier means, said at least one joint being a universal joint means, the center points of the ball joint and universal joint means being disposed on a substantially straight line.

13. A rigid driving axle construction for driving the wheels of motor vehicles, especially cross-country commercial vehicles and buses, comprising axle gear means provided with output means on each side thereof, drive shaft means for each side of the vehicle operatively connecting said output means with a respective wheel, and tubularly shaped axle bearer means accommodating therewithin said drive shaft means, said axle bearer means extending at an inclination between the wheel centers and the axle gear means so that the wheel center lines are offset with respect to the center lines of the output means of the axle gear means, said axle gear housing means being arranged asymmetrically and being so inclined to horizontal that the center line of the output means thereof is approximately perpendicular to the bisector of the angle formed by the two tubularly shaped axle bearer means.

14. The driving axle construction according to claim 13, wherein the wheel center lines are inclined to the center lines of said axle gear output means.

15. The axle construction according to claim 13, further comprising at least one joint means operatively connected with a respective drive shaft means, and intermediate gear means operatively connecting said joint means with a corresponding wheel.

16. The axle construction according to claim 13, wherein said axle bearer means is flangedly connected to the housing of the axle gear means, the flange of the axle bearer means being disposed in the cross plane of one of said housing and bearer means and being correspondingly inclined at the other of said housing and bearer means.

References Cited

UNITED STATES PATENTS

| 3,227,237 | 1/1966 | Moreno et al. | 180—43 |
| 3,253,670 | 5/1966 | Thomas et al. | 180—43 |

FOREIGN PATENTS

| 374,617 | 6/1907 | France. |
| 557,004 | 4/1923 | France. |
| 952,795 | 3/1964 | Great Britain. |

A. HARRY LEVY, *Primary Examiner.*

U.S. Cl. X.R.

180—75, 88